United States Patent
Nakata et al.

(10) Patent No.: US 11,077,893 B2
(45) Date of Patent: Aug. 3, 2021

(54) DEFLECTOR STRUCTURE FOR AUTOMOBILE

(71) Applicant: Mazda Motor Corporation, Hiroshima (JP)

(72) Inventors: Akihiro Nakata, Higahsihiroshima (JP); Michiya Mizokane, Hatsukaichi (JP); Shuhei Nishida, Hiroshima (JP); Yoshiatsu Kuga, Hiroshima (JP); Ryo Yanagisawa, Hatsukaichi (JP); Masaaki Bessho, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 37 days.

(21) Appl. No.: 16/722,532

(22) Filed: Dec. 20, 2019

(65) Prior Publication Data

US 2020/0207427 A1    Jul. 2, 2020

(30) Foreign Application Priority Data

Dec. 26, 2018   (JP) .............................. JP2018-242859

(51) Int. Cl.
    *B62D 35/00*       (2006.01)
    *B62D 35/02*       (2006.01)

(52) U.S. Cl.
    CPC ........... *B62D 35/005* (2013.01); *B62D 35/02* (2013.01)

(58) Field of Classification Search
    CPC .............................. B62D 35/005; B62D 35/02
    USPC ........................................... 296/180.1, 180.2
    See application file for complete search history.

(56) References Cited

U.S. PATENT DOCUMENTS

| | | | |
|---|---|---|---|
| 9,573,634 B2* | 2/2017 | Ohira ..................... | B62D 25/08 |
| 2015/0225026 A1* | 8/2015 | Ohira ..................... | B62D 25/08 |
| | | | 296/180.1 |
| 2015/0274224 A1* | 10/2015 | Ito .......................... | B62D 35/02 |
| | | | 296/180.1 |
| 2016/0339970 A1* | 11/2016 | Shibutake .......... | B62D 25/2036 |
| 2018/0251165 A1 | 9/2018 | Shibutake et al. | |

FOREIGN PATENT DOCUMENTS

| | | | | |
|---|---|---|---|---|
| JP | 2017-77846 A | | 4/2017 | |
| WO | WO-2018163803 A1 * | | 9/2018 | ........... B62D 35/005 |
| WO | WO-2018180026 A1 * | | 10/2018 | ............. B62D 21/09 |

OTHER PUBLICATIONS

English translation of WO 2018163803; retrieved on Mar. 25, 2021 via PatentTranslate located at www.epo.org. (Year: 2021).*

* cited by examiner

*Primary Examiner* — Jason S Daniels
(74) *Attorney, Agent, or Firm* — Xsensus LLP (57) ABSTRACT

A deflector structure for an automobile. The deflector structure includes a protruding structure having an outer surface positioned to be hit by traveling air when the automobile travels forward. The outer surface of the protruding portion includes a first inclined portion located on a vehicle-width-direction outer side and inclined upward toward the automobile front side; and a second inclined portion located on a vehicle-width-direction inner side and inclined upward toward the automobile front side. An angle of inclination of the second inclined portion on an acute angle side of the second inclined portion with respect to a horizontal direction is smaller than an angle of inclination of the first inclined portion on an acute angle side of the first inclined portion with respect to the horizontal direction.

17 Claims, 8 Drawing Sheets

DEFLECTOR STRUCTURE FOR AUTOMOBILE

CROSS-REFERENCE TO RELATED APPLICATION

The present application claims priority to JP 2018-242859, filed Dec. 26, 2018, the entire contents of which are incorporated herein by reference.

BACKGROUND

Field of the Disclosure

The present disclosure relates to a deflector structure for an automobile.

Description of the Related Art

Hitherto, the turbulence of the air flow caused by front wheels has been suppressed in order to improve fuel efficiency of an automobile. The turbulence of the air flow is caused when traveling air that flows under the floor of the front portion of the automobile and reaches the front wheels when the automobile travels forward is disturbed by the rotation of the front wheels.

For example, in Japanese Patent Laid-Open No. 2017-77846, a deflector is installed on a lower surface ahead of a front wheel well in an automobile so that the traveling air caused when the automobile travels forward does not come into contact with a front wheel as much as possible. The deflector includes a wall portion that extends in the up-down direction so as to protrude downward from the lower surface ahead of the front wheel well in the automobile. The traveling air is caused to hit the wall portion.

SUMMARY

The inventors of the present disclosure have performed eager analysis for further improvement of aerodynamic characteristics. As a result, the following matter has become clear. Even when the deflector as that in Japanese Patent Laid-Open No. 2017-77846 described above is provided on the front side of a front wheel, an end surface of the front wheel on the vehicle-width-direction outer side thereof is generally located on the vehicle-width-direction outer side than an end of the wall portion of the deflector on the vehicle-width-direction outer side thereof, and hence the traveling air that has passed through the vehicle-width-direction outer side with respect to the wall portion extending in the up-down direction of the deflector hits a portion of the front wheel on the vehicle-width-direction outer side thereof. Therefore, at the height position that is lower than the lower end of the wall portion of the deflector, the pressure of an outer-side space portion located immediately in front of the portion of the front wheel on the vehicle-width-direction outer side thereof becomes higher than the pressure of the center space portion located immediately in front of the central portion of the front wheel in the vehicle width direction. When a pressure distribution as above is formed, the traveling air avoids the outer-side space portion and flows toward the rear side and the vehicle-width-direction outer side so as to be spaced apart from the outer-side space portion. The traveling air flowing as above is spaced apart from the end surface and flows to the rear side without flowing along the end surface of the front wheel on the vehicle-width-direction outer side thereof. Therefore, in the deflector of the related art, a separating flow (swirl) is easily generated in the vicinity of the end surface of the front wheel on the vehicle-width-direction outer side thereof, and there is room for improvement for more reduction of the air resistance of the automobile.

The present disclosure has been made in view of the points as above, and one of the objects thereof is to provide a deflector structure for an automobile to reduce air resistance of the automobile by causing traveling air caused when the automobile travels forward to flow along an end surface of a front wheel on a vehicle-width-direction outer side thereof.

According to one exemplary embodiment, the present disclosure is directed to a deflector structure for an automobile including a deflector mounted on a lower surface ahead of a front wheel well in the automobile so as to be spaced apart from a front wheel at a position ahead of the front wheel. A protruding portion protruding downward and having an end surface on an automobile front side of the protruding portion is provided on a lower surface of the deflector, the end surface being hit by traveling air caused when the automobile travels forward is provided on a lower surface of the deflector. The end surface of the protruding portion on the automobile front side of the protruding portion includes: a first inclined portion provided on a portion including an end portion of the end surface on a vehicle-width-direction outer side of the end surface and inclined upward toward the automobile front side; and a second inclined portion located on a vehicle-width-direction inner side than the first inclined portion and inclined upward toward the automobile front side. An angle of inclination of the second inclined portion on an acute angle side of the second inclined portion with respect to a horizontal direction is set to be smaller than an angle of inclination of the first inclined portion on an acute angle side of the first inclined portion with respect to the horizontal direction.

With the configuration described above, traveling air that has hit the first inclined portion and traveling air that has hit the second inclined portion pass the first inclined portion and the second inclined portion, respectively, and head toward the automobile rear side (traveling air flows to the lower side along the first inclined portion and the second inclined portion, and then heads toward the rear side through the lower side of the protruding portion). The traveling air that has passed the first inclined portion can be basically caused to hit the portion of the front wheel on the vehicle-width-direction outer side thereof and the traveling air that has passed the second inclined portion can be basically caused to hit the central portion of the front wheel in the vehicle width direction. The flow rate of the traveling air that hits the central portion of the front wheel in the vehicle width direction after passing the second inclined portion of which inclination is gentler than the first inclined portion is faster than the flow rate of the traveling air that hits the portion of the front wheel on the vehicle-width-direction outer side thereof after passing the first inclined portion. As a result, at the height position, which is below the lower end of the protruding portion of the deflector and at which the traveling air that has passed the first inclined portion and the second inclined portion hits the front wheel, the pressure of the center space portion located immediately in front of the central portion of the front wheel in the vehicle width direction becomes higher than the pressure of the outer-side space portion located immediately in front of the portion of the front wheel on the vehicle-width-direction outer side thereof. When a pressure distribution as above is formed, the traveling air avoids the center space portion of which pressure is high and easily flows to the outer-side space portion of which pressure is low. Therefore, in the space portion on the front side of the front wheel, the traveling air flows toward the rear side and the vehicle-width-direction outer side so as to head toward the outer-side space portion side from the center space portion side. The traveling air flowing from the center space portion side toward the outer-side space portion side flows to the rear side along the end surface of the front wheel on the vehicle-width-direction outer side thereof. Therefore, it is difficult for a separating flow (swirl) to be generated in the vicinity of the end surface of the front wheel on the vehicle-width-direction outer side thereof. Thus, the air resistance of the automobile can be reduced.

In one embodiment of the deflector structure for the automobile described above, the second inclined portion is preferred to be located on the vehicle-width-direction inner side than a center of the front wheel in a vehicle width direction.

In other words, the traveling air that hits the second inclined portion generally flows toward the automobile rear side and the vehicle-width-direction outer side by the round shape of the corner portion on the end portion of the front bumper in the vehicle width direction before hitting the second inclined portion. As a result, since the second inclined portion is located on the vehicle-width-direction inner side than the center of the front wheel in the vehicle width direction, the traveling air that has passed the second inclined portion basically hits the central portion of the front wheel in the vehicle width direction.

When the second inclined portion is located on the vehicle-width-direction inner side than the center of the front wheel in the vehicle width direction, the deflector is preferred to be mounted on a lower surface of a corner portion on an end portion of a front bumper of the automobile in the vehicle width direction, and the corner portion is preferred to be formed in a round shape so as to be positioned rearward toward the vehicle-width-direction outer side in a bottom view of the automobile.

As a result, the traveling air that has passed the second inclined portion hits the central portion of the front wheel in the vehicle width direction in a more secured manner.

As described above, the deflector structure for the automobile according to the aspect of the present disclosure causes, at the height position that is below the lower end of the protruding portion of the deflector and at which the traveling air that has passed the first inclined portion and the second inclined portion hits the front wheel, the pressure of the outer-side space portion located immediately in front of the portion of the front wheel on the vehicle-width-direction outer side thereof to become lower than the pressure of the center space portion located immediately in front of the central portion of the front wheel in the vehicle width direction. Thus, in the space portion on the front side of the front wheel, the traveling air caused when the automobile travels forward flows toward the rear side and the vehicle-width-direction outer side so as to head toward the outer-side space portion side from the center space portion side, and the traveling air flowing from the center space portion side toward the outer-side space portion side flows along the end surface of the front wheel on the vehicle-width-direction outer side thereof. As a result, the air resistance of the automobile can be reduced.

DETAILED DESCRIPTION OF THE PREFERRED EMBODIMENT

An embodiment of the present disclosure is described in detail below on the basis of the drawings.

Figure 1:
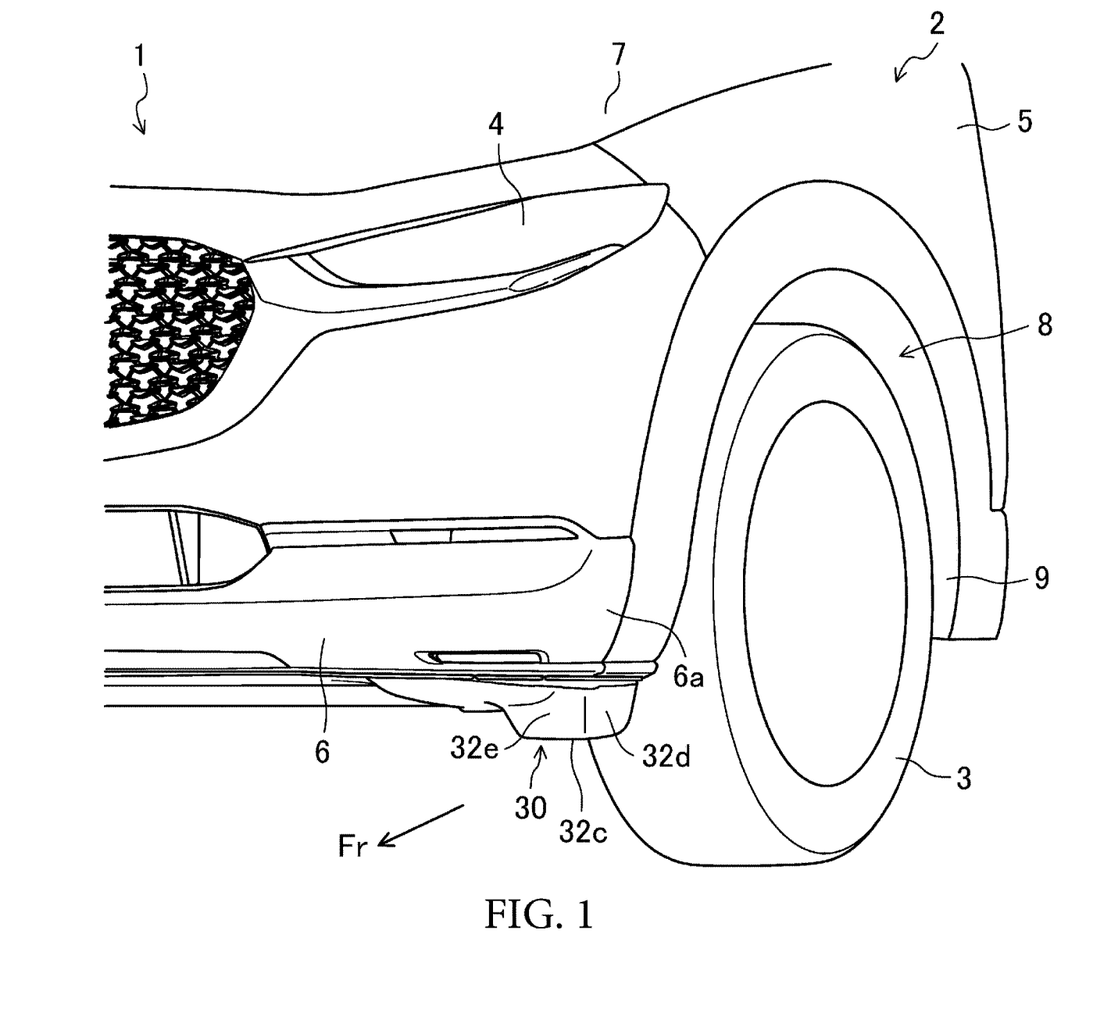
FIG. 1 is a perspective view illustrating a part (left-front-side portion) of a front portion of an automobile in which a deflector structure according to an embodiment of the present disclosure is employed.
Figure 2:
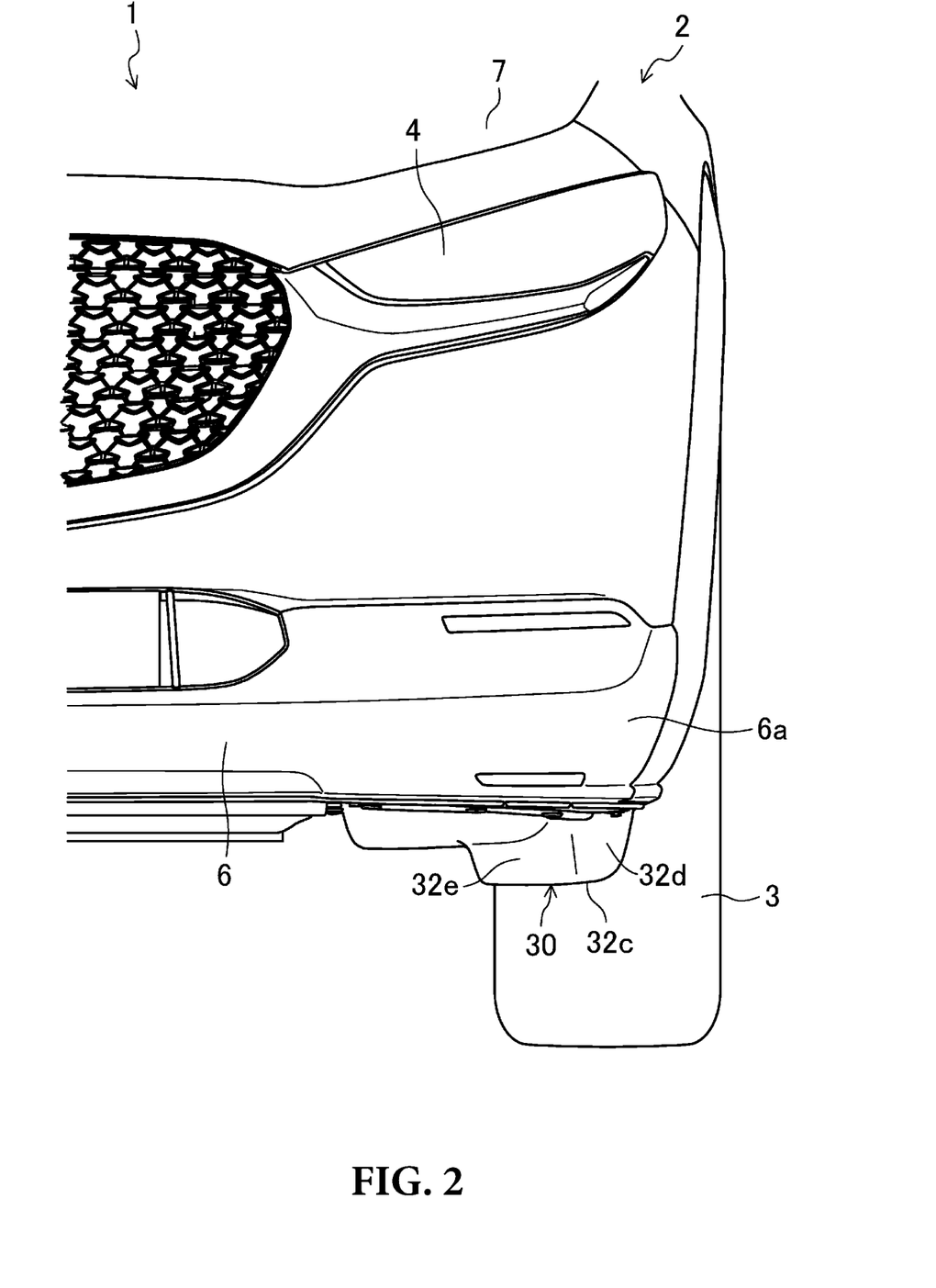
FIG. 2 is a front view of the left-front-side portion of the automobile described above.
Figure 3:
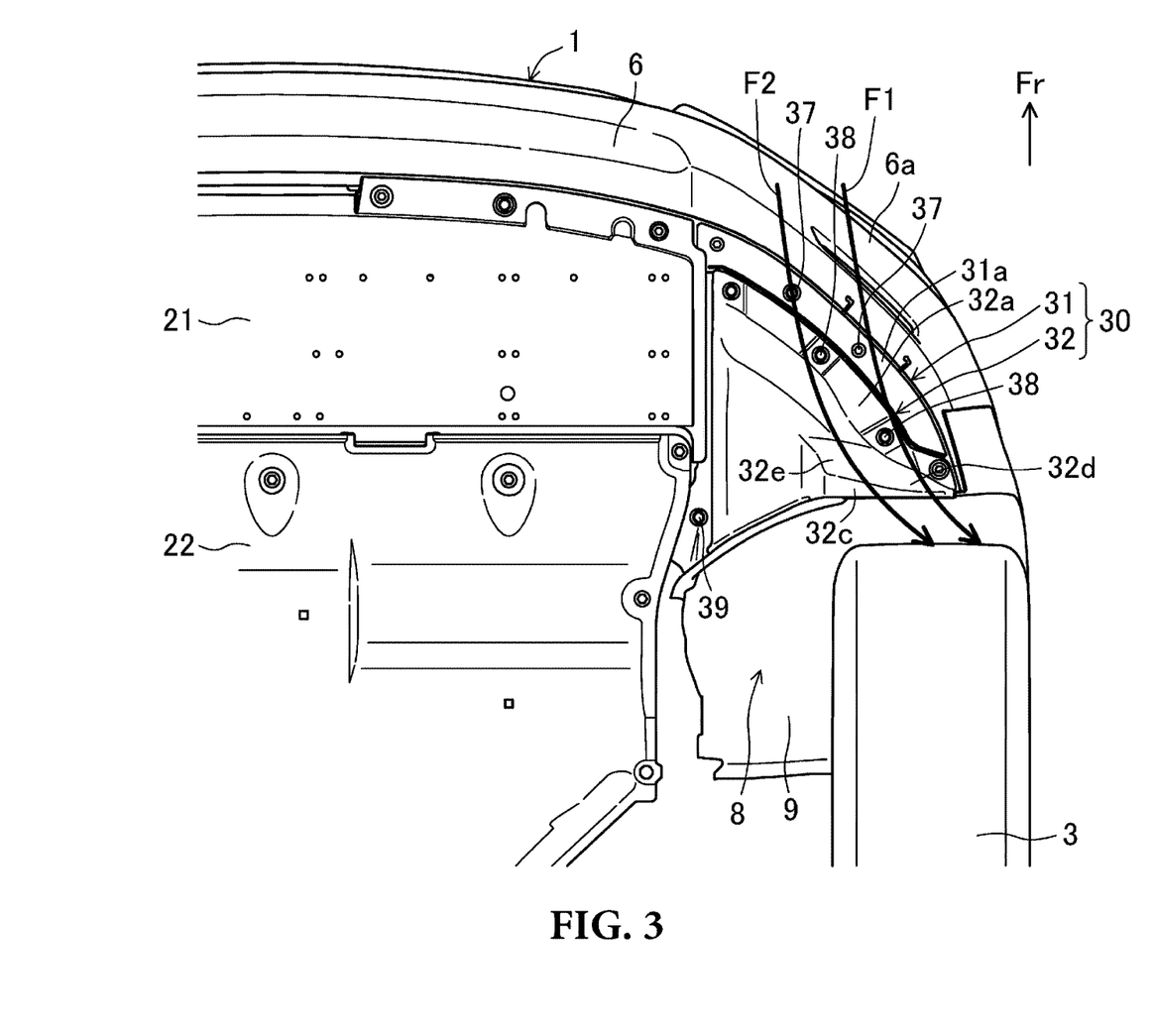
FIG. 3 is a bottom view of the left-front-side portion of the automobile described above.

FIG. 1 to FIG. 3 illustrate a part (left-front-side portion) of a front portion 2 of an automobile 1 in which a deflector structure according to the embodiment of the present disclosure is employed. "Front", "rear", "left", "right", "upper", and "lower" with respect to the automobile 1 are simply referred to as "front", "rear", "left", "right", "upper", and "lower" below. In the description below, only the left side is illustrated for components that form a left-and-right pair (for example, front wheels 3). Note that, in FIG. 1, arrow Fr indicates a direction ahead of the automobile 1 (the same applies to FIG. 3 to FIG. 6, FIG. 7A, and FIG. 7B).

The front portion 2 of the automobile 1 is a portion anterior to a passenger compartment which a driver of the automobile 1 gets into, and includes a mounting space (including an engine compartment) in which components relating to the traveling of the automobile 1 such as an engine, a transmission, a cooling apparatus, a suspension apparatus, a steering apparatus, and the left-and-right pair of the front wheels 3 are mounted, and lights toward ahead or sides of the automobile 1 such as headlights 4 and fog lamps.

The front portion 2 of the automobile 1 includes a left-and-right pair of front fenders 5 forming the side surfaces on both of left and right sides of the front portion 2, a front bumper 6 disposed on the front ends of the left-and-right pair of front fenders 5 (the front end of the automobile 1), and a hood 7 covering an upward opening of the mounting space (engine compartment) described above surrounded by the left-and-right pair of front fenders 5 and the front bumper 6.

Both end portions of the front bumper 6 in the vehicle width direction (left and right direction) are corner portions 6a that go around the sides on both of left and right sides from the front end of the automobile 1. The left and right corner portions 6a are each formed in a round shape so as to be positioned rearward toward the vehicle-width-direction outer sides in a bottom view of the automobile 1 (see FIG. 3).

A left-and-right pair of front wheel wells 8 in which the left and right front wheels 3 are accommodated are provided in the lower sides of the left and right front fenders 5. The front wheel wells 8 are covered with mud guards 9, and the mud guards 9 prevent mud, pebbles, and water drops splashed by the front wheels 3 from entering the mounting space described above. For example, the mud guards 9 are made of hard synthetic resin such as polypropylene, and are formed in a substantially arc shape so as to extend along the upper-side portions of the front wheels 3 in a side view of the automobile 1.

On the lower surface (bottom surface) in the front portion 2 of the automobile 1, a front-side under cover 21, and a rear-side under cover 22 located on the rear side thereof are provided. The rear-side under cover 22 is located on the front side of a suspension cross member (not shown) that extends in the vehicle width direction, and covers the lower side of the engine described above.

As illustrated in FIG. 1 to FIG. 3, a left-and-right pair of deflectors 30 are provided on the lower surface of the front portion 2 of the automobile 1. Each of the deflectors 30 are provided in a portion surrounded by the front end of the front wheel well 8 (the front end of the mud guard 9), the front bumper 6, and the front-side under cover 21. In other words, the deflector 30 is provided on the lower surface ahead of the front wheel well 8 in the automobile 1 so as to be spaced apart from a front wheel 3 at a position ahead of the front wheel 3. The deflectors 30 reduce the air resistance of the automobile 1 by controlling the flow of the traveling air caused when the automobile 1 travels forward.

The left and right deflectors 30 are attached to symmetrical positions with respect to the center of the automobile 1 in the vehicle width direction, and are formed in symmetrical shapes with respect to the center of the automobile 1 in the vehicle width direction. The configurations of the left and right deflectors 30 are basically the same, and hence the deflector 30 on the left side is described in detail below. The expressions of "front", "rear", "left", "right", "upper", and "lower" with respect to the deflector 30 on the left side described below are "front", "rear", "left", "right", "upper", and "lower" in a state in which the deflector 30 on the left side is provided on the automobile 1, and are the same as "front", "rear", "left", "right", "upper", and "lower" with respect to the automobile 1.

In this embodiment, the deflector 30 on the left side (hereinafter referred to as the deflector 30) is formed by two members including an upper member and a lower member that are an upper-side member 31 and a lower-side member 32. The upper-side member 31 is formed by a metal plate material, and the lower-side member 32 is formed by soft synthetic resin such as synthetic rubber having flexibility.

Figure 4:
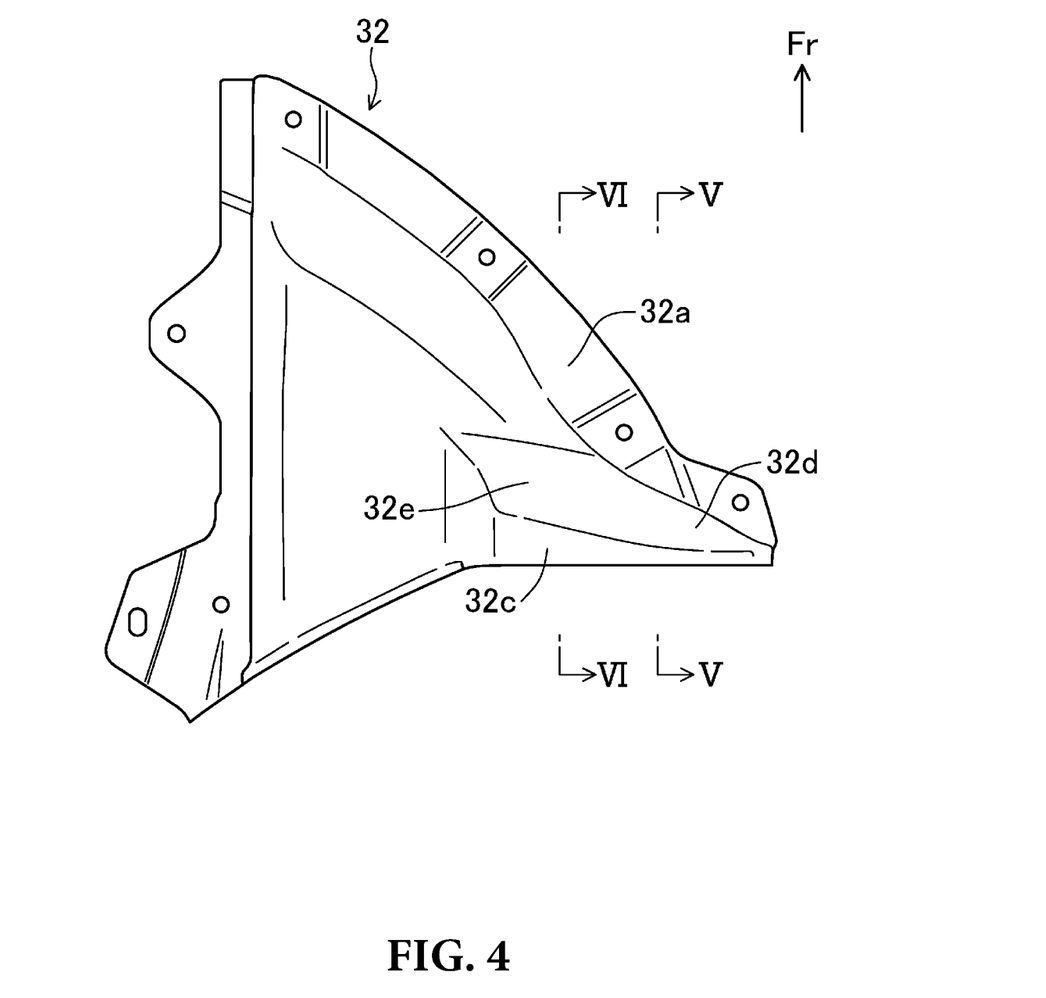
FIG. 4 is a bottom view illustrating a lower-side member in the deflector on the left side.

The upper-side member 31 includes a curved edge portion 31a from the front end to the end on the vehicle-width-direction outer side formed in a shape (round shape) similar to the corner portion 6a of the front bumper 6 in a bottom view of the automobile 1 (see FIG. 3 and FIG. 4). The curved edge portion 31a is mounted and fixed on the lower surface of the corner portion 6a by bolts 37 at a plurality of places. The rear end edge portion of the upper-side member 31 is a bent portion 31b (see FIG. 5 and FIG. 6) that is bent upward.

The lower-side member 32 includes a curved edge portion 32a (see FIG. 3 and FIG. 4) formed in a round shape as with the curved edge portion 31a and located on the inner side of the curved edge portion 31a of the upper-side member 31. The curved edge portion 32a is mounted and fixed to the upper-side member 31 by clips 38 at a plurality of places.

An end edge portion of the lower-side member 32 on the vehicle-width-direction inner side thereof vertically overlaps with an end edge portion of the upper-side member 31 on the vehicle-width-direction inner side thereof, and is mounted and fixed on the upper-side member 31 by bolts 39 at a plurality of places. The end edge portions of the upper-side member 31 and the lower-side member 32 on the vehicle-width-direction inner side thereof are supported on the front-side under cover 21 and the rear-side under cover 22.

The rear end edge portion of the lower-side member 32 is a vertical wall portion 32b (see FIG. 5 and FIG. 6) rising to the upper side, and the vertical wall portion 32b is mounted and fixed on the bent portion 31b of the upper-side member 31 by clips (not shown) at a plurality of places in the vehicle width direction. A front end portion of the mud guard 9 is also mounted and fixed on the bent portion 31b together with the vertical wall portion 32b by the clips.

On a portion that is a rear-side end portion of the lower surface of the deflector 30 (the lower surface of the lower-side member 32) and is on the vehicle-width-direction outer side, a protruding portion 32c that protrudes downward and has an end surface on the front side thereof to which the traveling air caused when the automobile 1 travels forward hits is provided. An end of the protruding portion 32c on the vehicle-width-direction outer side thereof is located closer to the vehicle-width-direction inner side than the end surface of the front wheel 3 (the front wheel 3 on the left side here) on the vehicle-width-direction outer side thereof (see FIG. 2 and FIG. 3). The end surface of the protruding portion 32c on the rear side thereof is formed by the vertical wall portion 32b (see FIG. 5 and FIG. 6). Note that, in this embodiment, the distance between the lower end of the protruding portion 32c and the horizontal ground is about 110 mm.

Figure 5:
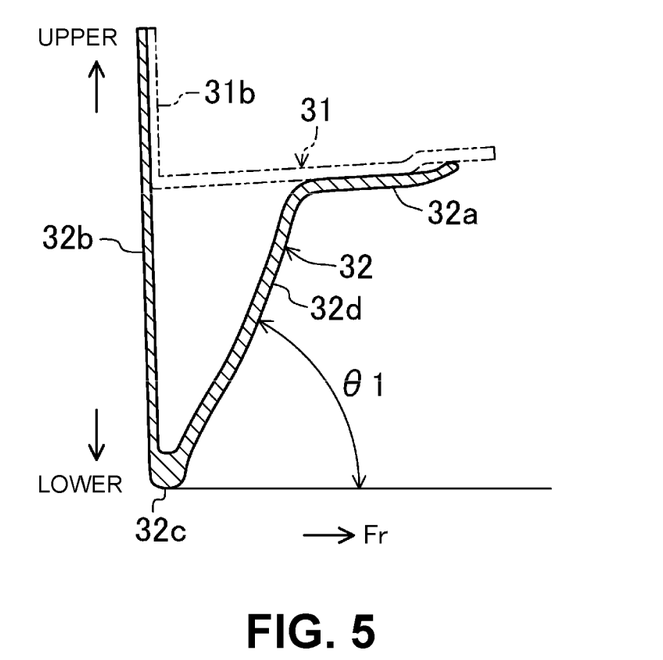
FIG. 5 is a cross-sectional view taken along line V-V in FIG. 4.
Figure 6:
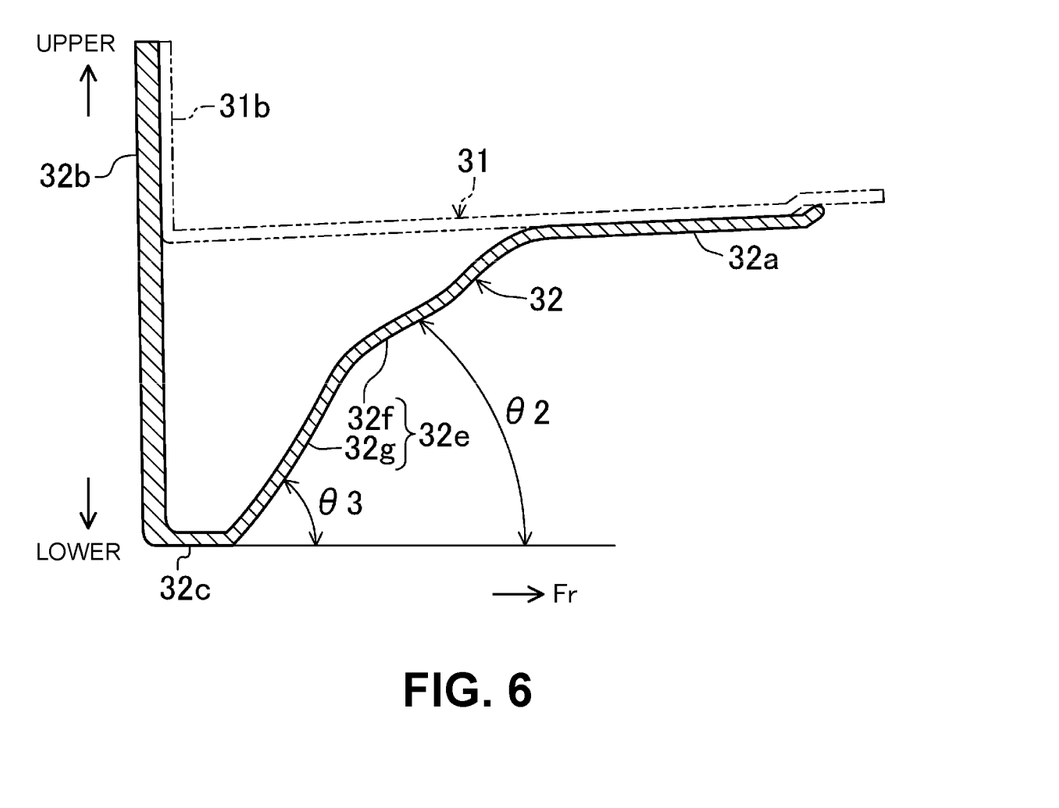
FIG. 6 is a cross-sectional view taken along line VI-VI in FIG. 4.

In this embodiment, as illustrated in FIG. 5 and FIG. 6, the end surface of the protruding portion 32c on the front side thereof to be hit by the traveling air includes a first inclined portion 32d provided in a portion including an end portion of the end surface on the vehicle-width-direction outer side thereof and inclined upward toward the front side, and a second inclined portion 32e located closer to the vehicle-width-direction inner side than the first inclined portion 32d and inclined upward toward the front side. The second inclined portion 32e includes an upper-side inclined portion 32f and a lower-side inclined portion 32g of which angles of inclination are different from each other. An angle of inclination $\theta 2$ of the upper-side inclined portion 32f on the acute angle side thereof with respect to the horizontal direction is set to be smaller than an angle of inclination $\theta 3$ of the lower-side inclined portion 32g on the acute angle side thereof with respect to the horizontal direction. The angles of inclination θ2 and θ3 of the second inclined portion 32e (the upper-side inclined portion 32f and the lower-side inclined portion 32g) on the acute angle side thereof with respect to the horizontal direction are set to be smaller than an angle of inclination θ1 of the first inclined portion 32d on the acute angle side thereof with respect to the horizontal direction. In this embodiment, the second inclined portion 32e is located on the vehicle-width-direction inner side than the center of the front wheel 3 in the vehicle width direction.

Traveling air that has hit the first inclined portion 32d and traveling air that has hit the second inclined portion 32e pass the first inclined portion 32d and the second inclined portion 32e, respectively, and head toward the rear side. In other words, traveling air that has hit the first inclined portion 32d and traveling air that has hit the second inclined portion 32e flow to the lower side along the first inclined portion 32d and the second inclined portion 32e, respectively, and then head toward the rear side through the lower side of the protruding portion 32c.

By the round shape of the corner portion 6a on the end portion of the front bumper 6 in the vehicle width direction, the traveling air that hits the end surface (the first inclined portion 32d and the second inclined portion 32e) of the protruding portion 32c on the front side thereof flows toward the rear side and the vehicle-width-direction outer side before hitting the end surface. As a result, since the second inclined portion 32e is located on the vehicle-width-direction inner side than the center of the front wheel 3 in the vehicle width direction, the traveling air that has hit the second inclined portion 32e basically hits the central portion of the front wheel 3 in the vehicle width direction after passing the second inclined portion 32e (see the flow of the traveling air indicated by an arrow F2).

Meanwhile, the traveling air that hits the first inclined portion 32d by flowing to the vehicle-width-direction outer side than the traveling air that hits the second inclined portion 32e also flows toward the rear side and the vehicle-width-direction outer side before hitting the first inclined portion 32d. As a result, the traveling air that has hit the first inclined portion 32d basically hits the portion of the front wheel 3 on the vehicle-width-direction outer side thereof after passing the first inclined portion 32d (see the flow of the traveling air indicated by an arrow F1).

The flow rate of the traveling air that hits the central portion of the front wheel 3 in the vehicle width direction after passing the second inclined portion 32e of which inclination is gentler than the first inclined portion 32d is faster than the flow rate of the traveling air that hits the portion of the front wheel 3 on the vehicle-width-direction outer side thereof after passing the first inclined portion 32d. As a result, at a height position (for example, the height position near the center between the lower end of the protruding portion 32c and the ground), which is below the lower end of the protruding portion 32c of the deflector 30 and at which the traveling air that has passed the first inclined portion 32d and the second inclined portion 32e hits the front wheel 3, the pressure of the center space portion located immediately in front of the central portion of the front wheel 3 (the front wheel 3 on the left side here) in the vehicle width direction becomes higher than the pressure of the outer-side space portion located immediately in front of the portion of the front wheel 3 on the vehicle-width-direction outer side thereof.

Figure 7A:
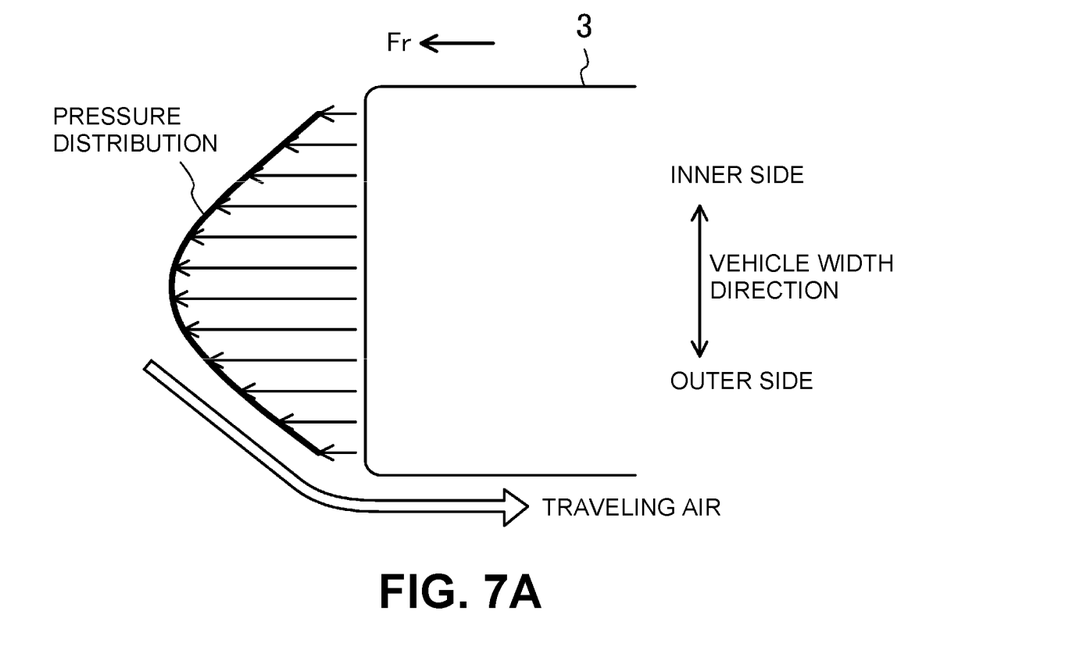
FIG. 7A illustrates a schematic pressure distribution in the vehicle width direction in a space portion immediately in front of a front wheel at a height position, which is below a lower end of a protruding portion of the deflector and at which traveling air that has passed a first inclined portion and a second inclined portion hits the front wheel, and the flow of the traveling air caused when the automobile travels forward in this embodiment.
Figure 7B:
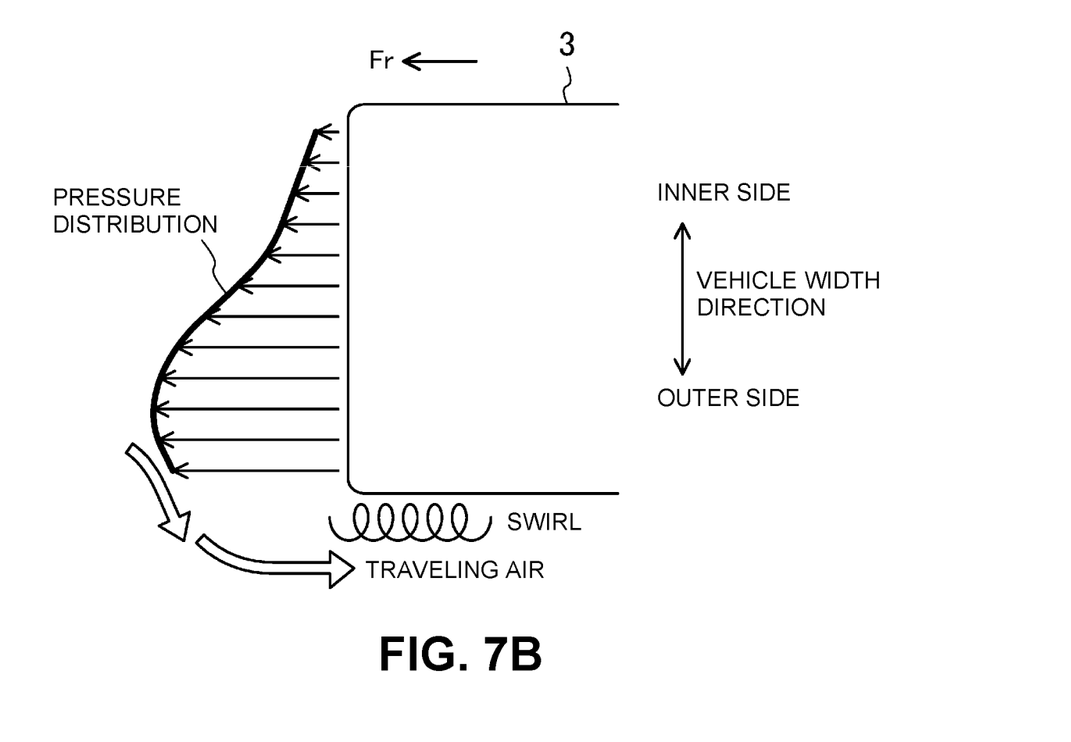
FIG. 7B illustrates a schematic pressure distribution in the vehicle width direction in a space portion immediately in front of a front wheel at a height position, which is below a lower end of a wall portion of a deflector of the related art and at which traveling air that has passed the wall portion hits the front wheel, and the flow of the traveling air caused when the automobile travels forward in a related-art example using the deflector of the related art instead of the deflector of this embodiment.

FIG. 7A illustrates a schematic pressure distribution in the vehicle width direction (the width direction of the front wheel 3) in the space portion immediately in front of the front wheel 3 at a height position, which is below the lower end of the protruding portion 32c of the deflector 30 and at which the traveling air that has passed the first inclined portion 32d and the second inclined portion 32e hits the front wheel 3, and the flow of the traveling air caused when the automobile 1 travels forward in this embodiment. FIG. 7B illustrates a schematic pressure distribution in the vehicle width direction in the space portion immediately in front of the front wheel 3 at a height position, which is below the lower end of the wall portion of the deflector and at which the traveling air that has passed a wall portion that extends in the up-down direction hits the front wheel 3, and the flow of the traveling air caused when the automobile 1 travels forward in a related-art example using a deflector (see Japanese Patent Laid-Open No. 2017-77846) including the wall portion described above instead of the deflector 30. In FIG. 7A and FIG. 7B, the pressure increases as the length of the arrow in the pressure distribution increases. In FIG. 7A and FIG. 7B, the outlined arrows indicate the flow of the traveling air.

In the related-art example described above, the traveling air that has passed through the vehicle-width-direction outer side with respect to the wall portion of the deflector hits the portion of the front wheel 3 on the vehicle-width-direction outer side thereof. Therefore, as illustrated in FIG. 7B, at the height position, which is below the lower end of the wall portion of the deflector and at which the traveling air that has passed the wall portion hits the front wheel 3, the pressure of the outer-side space portion becomes higher than the pressure of the center space portion. When a pressure distribution as above is formed, the traveling air avoids the outer-side space portion, and flows toward the rear side and the vehicle-width-direction outer side so as to be spaced apart from the outer-side space portion. The traveling air flowing as above does not flow along the end surface of the front wheel 3 on the vehicle-width-direction outer side thereof, and flows to the rear side so as to be spaced apart from the end surface. Therefore, a separating flow (swirl) is easily generated in the vicinity of the end surface of the front wheel 3 on the vehicle-width-direction outer side thereof with the deflector of the related-art example.

Meanwhile, in this embodiment, as illustrated in FIG. 7A, at the height position, which is below the lower end of the protruding portion 32c of the deflector 30 and at which the traveling air that has passed the first inclined portion 32d and the second inclined portion 32e hits the front wheel 3, the pressure of the outer-side space portion is lower than the pressure of the center space portion. When the pressure distribution as above is formed, the traveling air avoids the center space portion of which pressure is high and easily flows to the outer-side space portion of which pressure is low. Therefore, in the space portion on the front side of the front wheel 3, the traveling air flows toward the rear side and the vehicle-width-direction outer side so as to flow from the center space portion side toward the outer-side space portion side. The traveling air flowing from the center space portion side toward the outer-side space portion side flows to the rear side along the end surface of the front wheel 3 on the vehicle-width-direction outer side thereof. Therefore, it is difficult for a separating flow (swirl) to be generated in the vicinity of the end surface of the front wheel 3 on the vehicle-width-direction outer side thereof. Thus, the air resistance of the automobile 1 can be reduced. Note that, in this embodiment, the pressure of the inner-side space portion located immediately in front of the portion of the front wheel 3 on the vehicle-width-direction inner side thereof is also lower than the pressure of the center space portion, but the pressure of the inner-side space portion may be higher than the pressure of the center space portion.

Figure 8:
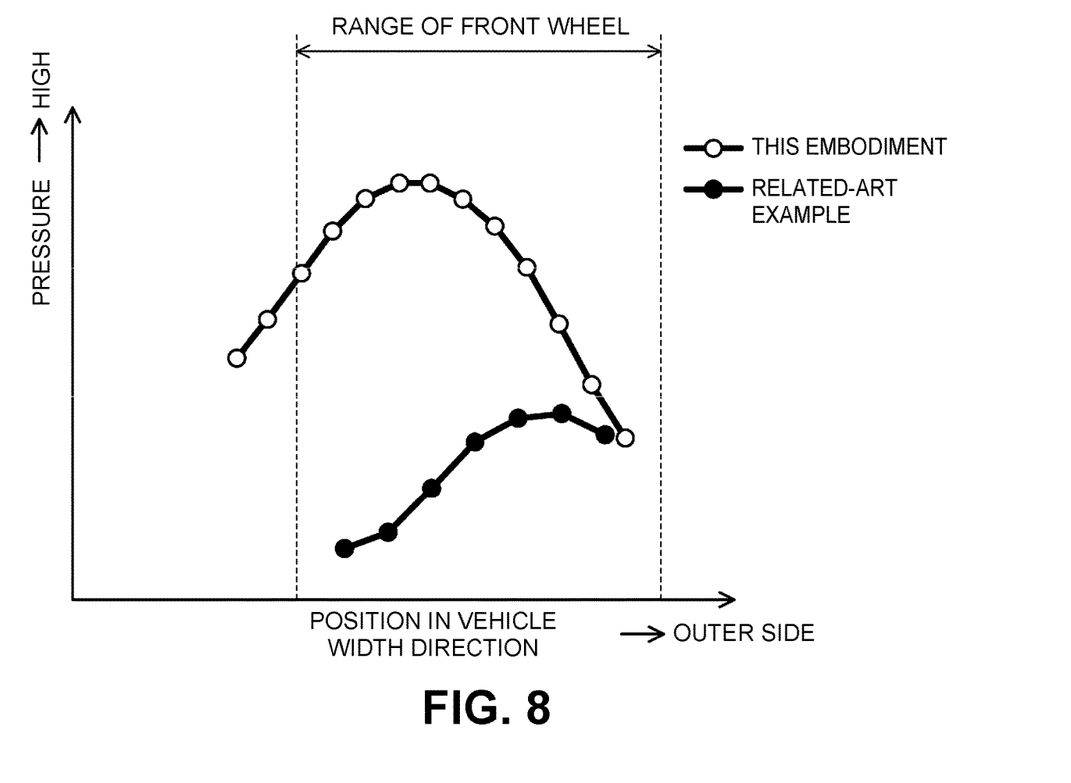
FIG. 8 is a graph showing results obtained by measuring the pressure distribution in the vehicle width direction in the space portion immediately in front of the front wheel at the height position, which is below the lower end of the protruding portion of the deflector and at which the traveling air that has passed the first inclined portion and the second inclined portion hits the front wheel, in this embodiment, and the pressure distribution in the vehicle width direction in the space portion immediately in front of the front wheel at the height position, which is below the lower end of the wall portion of the deflector of the related art and at which the traveling air that has passed the wall portion hits the front wheel, in the related-art example described above.

FIG. 8 shows results obtained by measuring the pressure distribution in the vehicle width direction in the space portion immediately in front of the front wheel 3 at the height position (the height position in the center between the lower end of the protruding portion 32c and the ground here), which is below the lower end of the protruding portion 32c of the deflector 30 and at which the traveling air that has passed the first inclined portion 32d and the second inclined portion 32e hits the front wheel 3, in this embodiment, and the pressure distribution in the vehicle width direction in the space portion immediately in front of the front wheel 3 at the height position (the height position in the center between the lower end of the wall portion described above and the ground here), which is below the lower end of the wall portion of the deflector and at which the traveling air that has passed the wall portion hits the front wheel 3, in the related-art example described above. The speed of the automobile at the time of measurement is 100 km/h for both cases. It can be understood that the results of the measurement are substantially the same as the schematic pressure distributions illustrated in FIG. 7A and FIG. 7B. Note that the pressure is basically higher in this embodiment than in the related-art example due to the following reason. In the related-art example, the flow rate of the traveling air considerably decreases by the wall portion. Meanwhile, in this embodiment, the traveling air easily passes the first inclined portion 32d and the second inclined portion 32e, and the flow rate of the traveling air does not decrease as in the related-art example.

Therefore, in this embodiment, the angles of inclination θ2 and θ3 of the second inclined portion 32e (the upper-side inclined portion 32f and the lower-side inclined portion 32g) of the protruding portion 32c described above are smaller than the angle of inclination θ1 of the first inclined portion 32d described above, and hence the pressure of the outer-side space portion becomes lower than the pressure of the center space portion at the height position, which is below the lower end of the protruding portion 32c of the deflector 30 and at which the traveling air that has passed the first inclined portion 32d and the second inclined portion 32e hits the front wheel 3. As a result, in the space portion on the front side of the front wheel 3, the traveling air flows toward the rear side and the vehicle-width-direction outer side so as to head toward the outer-side space portion side from the center space portion side, and the traveling air flowing from the center space portion side toward the outer-side space portion side flows along the end surface of the front wheel 3 on the vehicle-width-direction outer side thereof. Therefore, the air resistance of the automobile 1 can be reduced.

The present disclosure is not limited to the embodiment described above, and substitution is possible without departing from the gist of the claims.

The embodiment described above is merely an example, and the scope of the invention is not to be interpreted in a limited manner. The scope of the present invention is defined by the claims, and all modifications and changes that belong to the equivalent scope of the claims are within the scope of the present disclosure.

INDUSTRIAL APPLICABILITY

The present disclosure is useful as a deflector structure for an automobile including a deflector mounted on a lower surface ahead of a front wheel well in the automobile so as to be spaced apart from a front wheel at a position ahead of the front wheel.

REFERENCE SIGNS LIST 1 automobile
3 front wheel
6 front bumper
6a corner portion
8 front wheel well
30 deflector
32c protruding portion
32d first inclined portion
32e second inclined portion

What is claimed is:

1. A deflector structure for an automobile, the deflector structure comprising:
    a deflector mounted on a lower surface ahead of a front wheel well in the automobile;
    a protruding portion protruding downward and having an outer surface provided on a lower surface of the deflector, the outer surface positioned to be hit by traveling air when the automobile travels forward, wherein
    the outer surface of the protruding portion comprises
        a first inclined portion located on a vehicle-width-direction outer side and inclined upward toward the automobile front side; and
        a second inclined portion located on a vehicle-width-direction inner side and inclined upward toward the automobile front side, wherein
    an angle of inclination of the second inclined portion on an acute angle side of the second inclined portion with respect to a horizontal direction is smaller than an angle of inclination of the first inclined portion on an acute angle side of the first inclined portion with respect to the horizontal direction, and
    the deflector structure includes an upper member and a lower member that includes the protruding portion.

2. The deflector structure of claim 1, wherein
the second inclined portion is located nearer to the vehicle-width-direction inner side than a center of the front wheel in a vehicle width direction.

3. The deflector structure of claim 2, wherein
the deflector is mounted on a lower surface of a corner portion of a front bumper of the automobile.

4. The deflector structure of claim 3, wherein
the corner portion is formed in a round shape so as to be positioned rearward toward the vehicle-width-direction outer side in a bottom view of the automobile.

5. The deflector structure of claim 1, wherein
the upper member is formed by a metal plate material, and the lower member is formed of synthetic resin.

6. The deflector stricture of claim 1, wherein
the upper member includes a curved edge portion formed on the vehicle-width-direction outer side in a shape following a shape of a front bumper of the vehicle.

7. The deflector structure of claim 6, wherein
the curved edge portion is mounted at a plurality of positions to a lower surface of a corner portion of the bumper.

8. The deflector structure of claim 1, wherein
the lower member includes a first curved edge portion that is configured to be attached to the upper member by fasteners at a plurality of positions.

9. The deflector structure of claim 1, wherein
the upper member includes a first vertical wall portion, the lower member includes a second vertical wall portion, and the first vertical wall is configured to be attached to the second vertical wall by fasteners at a plurality of positions.

10. The deflector structure of claim 9, wherein the second vertical wall portion is integrally formed with the outer surface of the protruding portion.

11. The deflector structure of claim 1, wherein a distance between a lower edge of the protruding portion and the ground when the deflector structure is mounted to the vehicle is approximately 110 mm.

12. A deflector structure for an automobile, the deflector structure comprising:
- a deflector mounted on a lower surface ahead of a front wheel well in the automobile,
- a protruding portion protruding downward and having an outer surface provided on a lower surface of the deflector, the outer surface positioned to be hit by traveling air when the automobile travels forward, wherein the outer surface of the protruding portion comprises
- a first inclined portion located on a vehicle-width-direction outer side and inclined upward toward the automobile front side; and
- a second inclined portion located on a vehicle-width-direction inner side and inclined upward toward the automobile front side, wherein an angle of inclination of the second inclined portion on an acute angle side of the second inclined portion with respect to a horizontal direction is smaller than an angle of inclination of the first inclined portion on an acute angle side of the first inclined portion with respect to the horizontal direction, and the second inclined portion includes an upper-side inclined portion having a first angle of inclination and a lower-side inclined portion including a second angle of inclination.

13. The deflector structure of claim 12, wherein the first angle of inclination is different from the second angle of inclination.

14. The deflector stricture of claim 12, wherein the first angle of inclination of the upper-side inclined portion on the acute angle side thereof with respect to the horizontal direction is smaller than the second angle of inclination of the lower-side inclined portion on the acute angle side thereof with respect to the horizontal direction.

15. The deflector structure of claim 12, wherein the first and second angles of inclination on the acute angle side thereof with respect to the horizontal direction are smaller than an angle of inclination of the first inclined portion on the acute angle side thereof with respect to the horizontal direction.

16. A deflector structure for an automobile, the deflector structure comprising:
- a protruding structure having an outer surface positioned to be hit by traveling air when the automobile travels forward, wherein the outer surface comprising
- a first inclined portion located on a vehicle-width-direction outer side and inclined upward toward the automobile front side; and
- a second inclined portion located on a vehicle-width-direction inner side and inclined upward toward the automobile front side, wherein an angle of inclination of the second inclined portion on an acute angle side of the second inclined portion with respect to a horizontal direction is smaller than an angle of inclination of the first inclined portion on an acute angle side of the first inclined portion with respect to the horizontal direction, the second inclined portion includes an upper-side inclined portion having a first angle of inclination and a lower-side inclined portion including a second angle of inclination, and the first angle of inclination of the upper-side inclined portion on the acute angle side thereof with respect to the horizontal direction is smaller than the second angle of inclination, of the lower-side inclined portion on the acute angle side thereof with respect to the horizontal direction.

17. The deflector structure of claim 16, wherein the second inclined portion is located closer to a first edge of a wheel of the vehicle closer to the vehicle-width-direction inner side than a second edge of the wheel of the vehicle closer to a vehicle-width-direction outer side.

* * * * *